(12) United States Patent
Lindberg et al.

(10) Patent No.: US 11,143,883 B2
(45) Date of Patent: Oct. 12, 2021

(54) SPECTACLES WITH INTERCHANGEABLE LENSES

(71) Applicant: Lindberg A/S, Aabyhoj (DK)

(72) Inventors: Henrik Lindberg, Risskov (DK); Hans Boye-Nielsen, Hinnerup (DK); Thomas Mach, Skodstrup (DK); Lars Bøjvad, Hojbjerg (DK); Ulrik Caspersen, Viby J (DK)

(73) Assignee: Lindberg A/S, Aabyhoj (DK)

( * ) Notice: Subject to any disclaimer, the term of this patent is extended or adjusted under 35 U.S.C. 154(b) by 301 days.

(21) Appl. No.: 16/333,692

(22) PCT Filed: Sep. 12, 2017

(86) PCT No.: PCT/DK2017/050287
§ 371 (c)(1),
(2) Date: Mar. 15, 2019

(87) PCT Pub. No.: WO2018/050188
PCT Pub. Date: Mar. 22, 2018

(65) Prior Publication Data
US 2019/0227340 A1    Jul. 25, 2019

(30) Foreign Application Priority Data

Sep. 16, 2016 (DK) .................... 2016 70719

(51) Int. Cl.
*G02C 1/04* (2006.01)
*G02C 5/00* (2006.01)
*G02C 5/22* (2006.01)

(52) U.S. Cl.
CPC ............. *G02C 1/04* (2013.01); *G02C 5/00* (2013.01); *G02C 5/22* (2013.01); *G02C 2200/08* (2013.01); *G02C 2200/12* (2013.01)

(58) Field of Classification Search
CPC ... G02C 1/00; G02C 9/00; G02C 9/02; G02C 9/04; G02C 2200/08; G02C 2200/06; G02C 2200/10; G02C 1/04
(Continued)

(56) References Cited

U.S. PATENT DOCUMENTS

| 5,135,296 A * | 8/1992 | Lindberg | ................ G02C 1/02 351/103 |
| 7,883,205 B2 * | 2/2011 | Begg | ..................... G02C 7/086 351/48 |

(Continued)

FOREIGN PATENT DOCUMENTS

| BE | 550087 A | 8/1956 |
| CN | 1826459 A | 8/2006 |

(Continued)

OTHER PUBLICATIONS

International Preliminary Report on Patentability for International Application No. PCT/DK2017/050287, dated Jan. 10, 2019.
(Continued)

*Primary Examiner* — Hung X Dang
(74) *Attorney, Agent, or Firm* — Elmore Patent Law Group, P.C.; Joseph Zucchero; Carolyn Elmore (57) ABSTRACT

Spectacles with interchangeable eyeglass lenses (2), where the spectacles comprise a spectacles frame (1) and eyeglass lenses (2), where the eyeglass lenses comprise a mount (3) which is secured to an outer edge of the eyeglass lenses, and where at least one of the mount and the spectacles frame comprises a coupling element (8), which can couple together the mount (3) and the spectacles frame (1), thereby producing a spectacles frame in which the eyeglass lenses can be replaced as desired. Furthermore, the mount or the spectacles frame comprises an oblong recess (5) designed to receive a partial section (7) of the spectacles frame or a bulge on the mount. Said spectacles are suitable for use at
(Continued)

work, bicycling in blustery weather, or skiing in harsh sunlight.

10 Claims, 9 Drawing Sheets

(58) Field of Classification Search
USPC .................................................. 351/103, 106
See application file for complete search history.

(56) References Cited

U.S. PATENT DOCUMENTS

| | | |
|---|---|---|
| 2004/0263774 A1 | 12/2004 | Chao et al. |
| 2009/0051866 A1 | 2/2009 | Dichiara |
| 2009/0190089 A1 | 7/2009 | Wang |
| 2011/0032471 A1 | 2/2011 | Feng |
| 2012/0105799 A1 | 5/2012 | Stewart |
| 2013/0070197 A1 | 3/2013 | Chang |
| 2013/0194538 A1 | 8/2013 | Junkins |
| 2017/0184872 A1 | 6/2017 | Silver |

FOREIGN PATENT DOCUMENTS

| | | |
|---|---|---|
| CN | 1826549 A | 8/2006 |
| CN | 201689228 U | 12/2010 |
| CN | 201936086 U | 8/2011 |
| CN | 103777366 A | 5/2014 |
| DK | 90824 C | 5/1961 |
| FR | 1594831 A | 6/1970 |
| JP | H01125420 U | 8/1989 |
| JP | 2001215449 A | 8/2001 |
| JP | 2012518561 A | 8/2012 |
| KR | 20110035498 A | 4/2011 |
| KR | 20130041709 A | 4/2013 |
| WO | 9820386 A1 | 5/1998 |
| WO | 9949350 A1 | 9/1999 |
| WO | 2009103355 A1 | 8/2009 |

OTHER PUBLICATIONS

English language translation of Office Action in Japanese Patent Application No. 2019-515259, dated Jul. 29, 2021.

* cited by examiner

SPECTACLES WITH INTERCHANGEABLE LENSES

AREA OF THE INVENTION

The present invention concerns spectacles with interchangeable eyeglass lenses, where the spectacles comprise a spectacles frame and eyeglass lenses.

The invention furthermore concerns a spectacles frame for spectacles with interchangeable eyeglass lenses and eyeglass lenses for spectacles with interchangeable eyeglass lenses.

BACKGROUND OF THE INVENTION

Active people have a need for aids to see properly, and at present there are a number of possibilities for use of spectacles and contact lenses.

Spectacles which are used daily may for example be replaced by dedicated sports spectacles in connection with the practicing of sports such as badminton and running, while contact lenses are more suitable for sports involving physical contact such as soccer and handball.

In less physically strenuous activities where everyday spectacles are not an annoyance, the spectacles of daily use may have a sunglass lens placed on top of the existing eyeglass lenses, for example.

Furthermore, there are spectacles in which various colored sunglass lenses can be mounted in a frame and the spectacles are presented as integrated spectacles.

Purpose of the Invention

The purpose of the invention is to provide spectacles with interchangeable lenses, where the spectacles frame is the same, but the eyeglass lenses can be replaced by the user as desired and needed, according to use at work, bicycling in blustery weather, or skiing in harsh sunlight.

Furthermore, one purpose of the invention is so that the users themselves can replace the lenses and carry along with them various interchangeable lenses so as to handle every possible need.

Thus, it is also a purpose of the invention to transform a pair of ordinary everyday spectacles into a pair of sunglasses and vice versa.

DESCRIPTION OF THE INVENTION

According to a first aspect of the invention, the above-indicated purpose is achieved with spectacles with interchangeable eyeglass lenses, as described in the introduction and as described in the preamble of claim 1, where each eyeglass lens is fitted in a mount which is secured to an outer edge of the eyeglass lens, and where at least one of the mount and the spectacles frame comprises a coupling element, which can detachably couple together the mount and the spectacles frame, and in that the mount or the spectacles frame comprises an oblong recess designed to receive a partial section of the spectacles frame or a bulge on the mount.

This makes it possible for a user in a quick, easy, and practical manner to couple together the mount and the spectacles frame, for example, when it is desired to employ eyeglass lenses with different properties. For example, this may be with or without sun screening or a shift between eyeglass lenses with different grinding.

Preferably the coupling is done without the use of tools, but primarily by a mere elastic deformation of the coupling elements themselves or the spectacles frame/mount.

The coupling element on the spectacles frame may have the shape, for example, of a hook-shaped or saw tooth coupling element, which is adapted to engage with the eyeglass lens mount, which may comprise for example a pin, a peg, or a corresponding arrangement.

In one special embodiment, the invention is distinguished in that the mount comprises an oblong recess and in that the pin, preferably a cylindrical pin, is mounted in aligned boreholes in each side wall of the mount's recess.

The coupling element may be a U-shaped notch in the spectacles frame. Such a U-shaped notch will provide a secure engagement with a pin in the mount of the eyeglass lens and the pin may have a shape corresponding to the shape of the notch. This ensures a proper positioning of the eyeglass lens in that the lens will be seated in a firm position in relation to the frame. The pin will preferably be a cylindrical pin, which is mounted in aligned boreholes in each side wall of the mount's recess. The pin will preferably be a metal pin. A metal pin will be a stable and strong coupling element for engagement with the frame's notch.

In an alternative and reversed embodiment, the coupling element on the mount may have for example the shape of a hook-shaped or saw tooth coupling element, which is adapted to engage with the spectacles frame.

It is possible to employ hook-shaped or saw tooth coupling elements on both the mount and the spectacles frame.

The coupling elements are preferably brought into engagement by an elastic resilience in the spectacles frame so as to accomplish a snap engagement between the coupling elements.

The mounting will preferably occur in that one side of the mount is placed in the frame such that the coupling elements at the first side are brought into engagement. After this, the mount and the frame are mutually swiveled until the coupling elements on the other side are brought into engagement. One can thus establish an axis of rotation at the first coupling elements, which ensures a simple swiveling and thus makes it easier to replace the eyeglass lenses.

It is thus preferable for the mount to have coupling elements on each side and for at least the first coupling elements on a first side of the mount to form a rotational connection with corresponding first coupling elements on the frame.

A recess on the outside of the mount has the effect that part of the spectacles frame is set into the mount itself. As a result, the spectacles frame is less conspicuous in its appearance.

A guiding of the plate-shaped frame in the recess will further contribute to obtaining rigid spectacles.

The recess will furthermore guide and secure the lens properly in relation to the frame. In modern spectacles, it is important for the lenses to be arranged properly in relation to the eye in order to make the best possible use of the grinding of the lenses.

It is important for the lenses to be placed correctly both when used during quiet activity, such as reading, and during activity, such as the practicing of a sport.

The fixation of the lenses in spectacles with a rigid structure will also ensure that the lenses are placed such as to accomplish an optimal wind deflection. This is important to the use of spectacles for an active user, for example during skiing or another sport.

The present invention in a third aspect also concerns spectacles with interchangeable eyeglass lenses, where the spectacles frame comprises a substantially m-shaped elastically deformable front bridge.

This makes it possible to have the spectacles frame stretch around the eyeglass lenses, where the legs of the spectacles frame's m-shape form are forced slightly away from each other when mounting the eyeglass lenses and where the legs after the mounting of the eyeglass lenses return to their original shape, where the coupling elements likewise secure the spectacles frame with the eyeglass lenses and thus ensure the engagement of the spectacles frame with the mount of the lenses.

The present invention in a third aspect also concerns spectacles with interchangeable eyeglass lenses, where the front bridge is made of sheet metal, preferably by being folded from a flat blank.

This makes it possible to produce the spectacles from sheet material and thus it is possible to punch out or laser cut the front bridge of the frame as a flat blank, which is then bent to the desired shape. Furthermore, a large bending torque is achieved based on the respective material thickness.

The sheetlike metal also ensures good user comfort. It is easy to adapt the spectacles to different head shapes.

The side bars of the spectacles are likewise made from a sheet material. A flat blank is produced, which is then bent into the desired shape. The desired shape includes an ear bend.

This is different from a so-called "straight arm", which is a rectilinear side bar which is secured by clamping action and does not have an ear bend. The ear bend makes sure that the spectacles sit firmly and precisely on a user, even during physical activities.

The present invention in a fourth aspect also concerns spectacles with interchangeable eyeglass lenses, where the spectacles frame is made primarily of titanium.

This makes it possible to ensure very high strength in relation to very low weight. Furthermore, a very good corrosion resistance is achieved. As an alternative to pure titanium, it is possible to use an alloy of titanium and vanadium, for example. Thus, materials for the frame are any given materials which provide comfort to the user.

The present invention in a variant of this fifth aspect also concerns spectacles with interchangeable eyeglass lenses, where the recess has a funnel-shaped entry opening. The funnel-shaped entry opening can have straight walls which form the funnel or it can be formed by rounding of the side edges of the entry opening which form a funnel with curved wall.

When a user is going to replace eyeglass lenses, the user will be visually impaired to a varying degree and will in principle be able to change the lenses with eyes closed. Thanks to the recess having a funnel-shaped entry opening, it becomes easy for the user to introduce the plate-shaped frame in the recess. This is done especially easily by establishing an engagement at the one side of the mount and swiveling the mount until the other side of the mount is brought to engage in the recess.

The present invention in a fifth aspect also concerns spectacles with interchangeable eyeglass lenses, where the mount comprises at least one partial section to influence the light penetration from one side of the eyeglass lens.

This makes it possible, in the manner of blinders used for horses, among other things, to exclude unwanted light penetration preferably from the side, but there might likewise or also be an exclusion of light penetration from above or from below.

In the event that the spectacles are being used in regions with powerful sunlight, such as on ski trips where the sun is reflected in the snow, it may be very comfortable to avoid this strong light influence also from areas other than straight in front of the user.

In practice, the most troublesome reflexes in eyeglass lenses are the reflexes produced on the backside of the lens, i.e., the side facing the user. This is known as back reflection.

By diminishing the back reflection, the user will have a better view through the spectacles. When back reflection is reduced or prevented entirely, there will be less need for a coating on the back side of the lens to reduce the back reflection. It is generally desirable to reduce the coating, since abrasion and mechanical effects can reduce the coating's effect.

The present invention in a sixth aspect also concerns spectacles with interchangeable eyeglass lenses, where the mount comprises at least a partial section for influencing of an air flow at the eyeglass lens.

This makes it possible, as also mentioned above with blinders, to exclude air currents from the eye sections of the face. If the spectacles wearer is on skis or if the person is riding a bicycle or a sports car with the hood down, air currents might be very annoying to the user and cause a lot of eye irritation.

The mounts can be configured so that it is possible to prevent turbulence and break up air swirling behind the lenses.

The mounts can also be configured to form an ornamental part of the spectacles, so that it has an aesthetic appearance even if the mount is of large size.

The mount may thus comprise, in a partial section, breakthroughs in the material in the form of gaps or holes for influencing of air flow past the spectacles. These breakthroughs may contribute to the ornamental appearance of the spectacles. The partial section may likewise comprise spoilers of various shape for influencing of air flow past the spectacles.

The present invention in a seventh aspect also concerns spectacles with interchangeable eyeglass lenses, where the eyeglass lenses are made primarily of silica or polycarbonate. But other polymers may also be used.

This makes it possible to ensure good optical properties and a shiny surface and furthermore it provides great impact strength without forming fragments. Furthermore, other properties of the lenses may be utilized, such as polarization of the lenses, contrast accentuating properties, progressive lenses.

Changes in the lenses may also contribute to the aesthetic appearance of the spectacles.

The present invention in an eighth aspect also concerns a spectacles frame for spectacles with interchangeable eyeglass lenses, where the spectacles frame comprises at least one coupling element, which is designed for coupling to an eyeglass lens.

This makes it possible to replace the spectacles frame as desired or needed, for everyday use or for festive occasions, according to color and shape, but where the eyeglass lenses can be used with several spectacles frames and vice versa.

Thus, both color and shape of the frame can be changed. For example, it may be advantageous to use a frame which fits inside a helmet when using the spectacles during activity requiring a helmet.

The present invention in a ninth aspect also concerns an eyeglass lens for spectacles with interchangeable eyeglass lenses, where a mount for the eyeglass lens comprises at least one coupling element, which is designed for coupling to a spectacles frame.

This makes it possible to change eyeglass lenses as desired and needed, according to color and mount, blinders or other features, where different types of eyeglass lenses can be used with one or more spectacles frames.

DESCRIPTION OF DRAWINGS

In the description of the figures, identical or corresponding elements shall be denoted by the same reference number in the different figures. Thus, no explanation will be given for all details in connection with each individual figure/embodiment.

LIST OF REFERENCE NUMBERS

1 Spectacles frame
2 Eyeglass lenses
3 Mount, eyeglass lenses
4 Outer edge, eyeglass lenses
5 Recess, mount 5' Recess, spectacles frame
6 Front bridge, spectacles frame
7 Partial section, mount
8 Coupling element, spectacles frame
8' Coupling element, mount
9 Side bar
10 Nose pad
11 Tooth, coupling element spectacles frame
11' Tooth, coupling element mount
12 Hook, coupling element spectacles frame
12' Hook, coupling element mount
13 Funnel-shaped entry opening of recess, mount
14 Gaps
15 Holes
16 Bulge, mount
17 U-shaped notch
18 Borehole
19 Pin

DETAILED DESCRIPTION OF THE INVENTION

Figure 1:
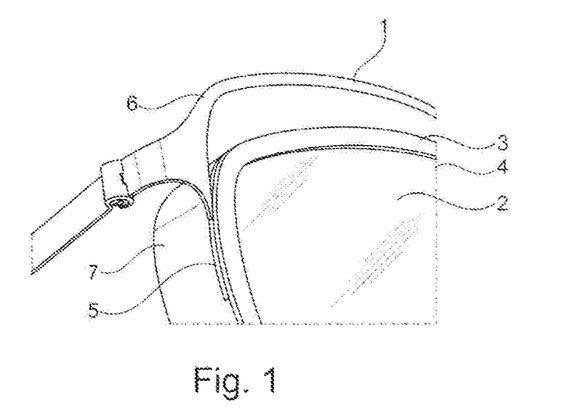
FIG. 1 shows a spectacles frame during mounting of interchangeable eyeglass lenses.

FIG. 1 shows a spectacles frame 1 during mounting of interchangeable eyeglass lenses 2, where it is seen that the eyeglass lenses 2 comprise a mount 3, which is secured to an outer edge 4 of the eyeglass lenses 2.

It is likewise seen that the mount 3 comprises an oblong recess 5 designed to receive a partial section of the spectacles frame 1, where the spectacles frame 1 comprises a substantially m-shaped elastically deformable front bridge 6.

The actual coupling between the mount 3 and the spectacles frame 1 is explained more closely in the following.

Figure 2:
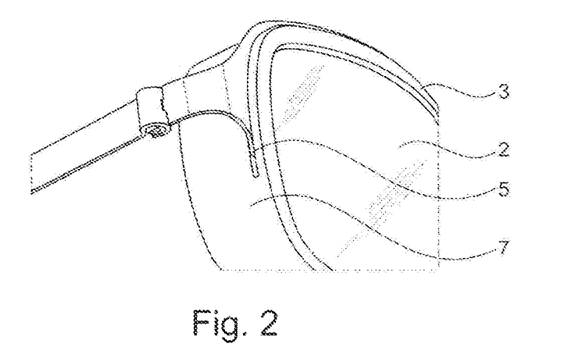
FIG. 2 shows a spectacles frame after mounting of interchangeable eyeglass lenses.
Figure 3:
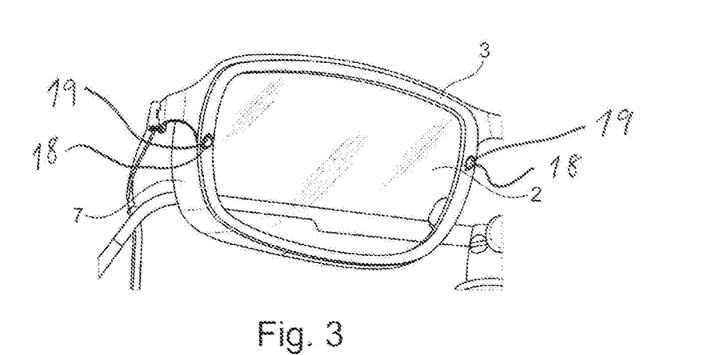
FIG. 3 shows a spectacles frame after mounting of interchangeable eyeglass lenses seen in perspective.

The FIGS. 1, 2 and 3 moreover show that the mount 3 comprises at least one partial section 7 for influencing of the penetration of light and/or for influencing an air flow at one side of the eyeglass lens 2.

Figure 4:
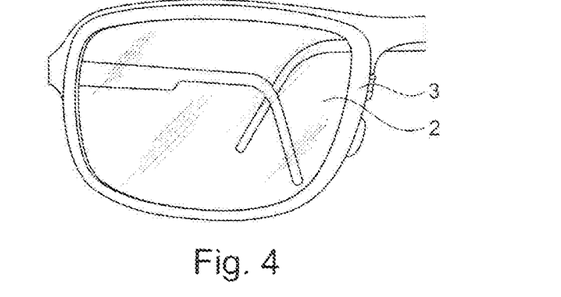
FIG. 4 shows a spectacles frame after mounting of interchangeable eyeglass lenses seen from the front.

The FIGS. 2, 3 and 4 show a spectacles frame 1 after mounting of interchangeable eyeglass lenses 2. Thus, there is shown a part of spectacles, where the spectacles comprise the spectacles frame 1 and an interchangeable eyeglass lens 2

Figure 5:
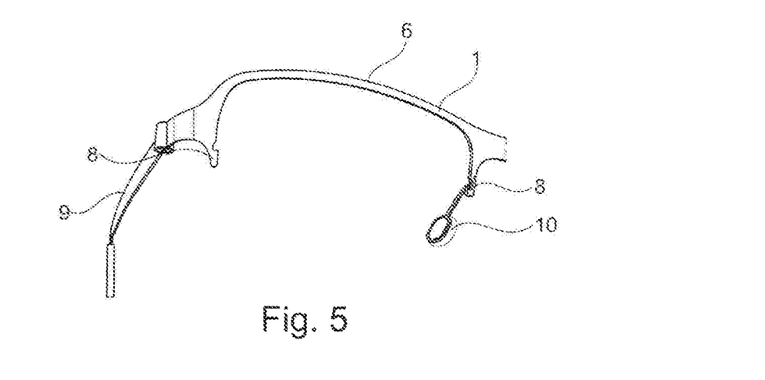
FIG. 5 shows a spectacles frame without eyeglass lenses seen in perspective.
Figure 6:
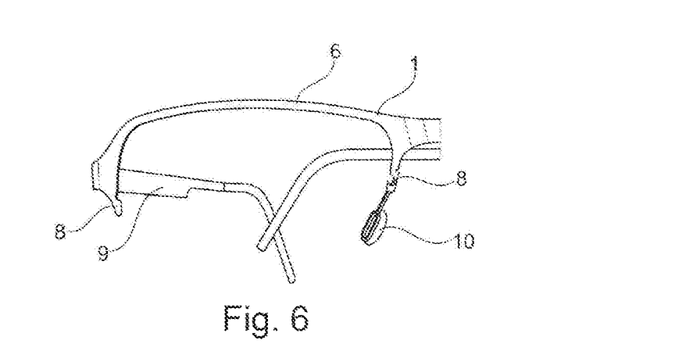
FIG. 6 shows a spectacles frame without eyeglass lenses seen from the front.

The FIGS. 5 and 6 show a spectacles frame 1 without eyeglass lenses 2, where it is seen that the spectacles frame 1 comprises two coupling elements 8, which can couple together the mount 3 and the spectacles frame 1.

Where a spectacles frame 1 has a side bar 9 on either side of a front bridge 6 and a nose bridge or two nose pads 10, FIGS. 5 and 6 show coupling elements 8 both at the side where the side bar 9 is placed and in the middle where the nose pad 10 is placed.

Figure 7:
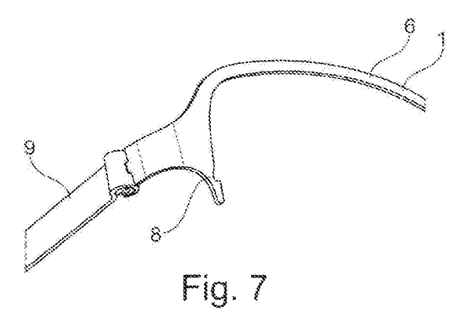
FIG. 7 shows a detail of a spectacles frame without eyeglass lenses.

FIG. 7 shows a detail of a coupling element 8 at the side where the side bar 9 is placed.

Figure 8:
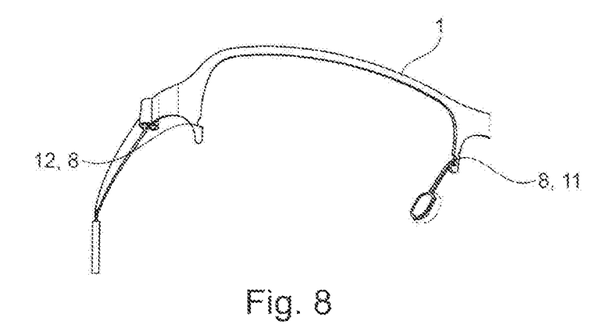
FIG. 8 shows a spectacles frame without eyeglass lenses in an alternative embodiment seen in perspective.
Figure 9:
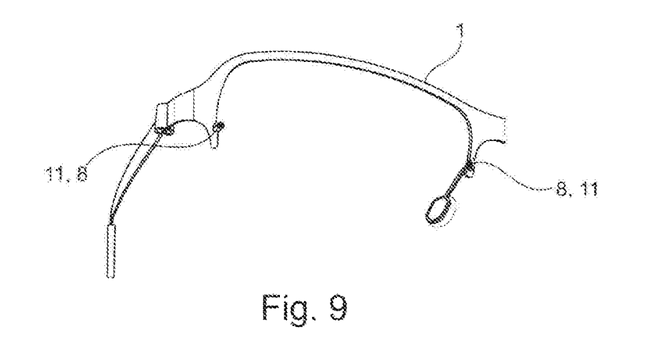
FIG. 9 shows a spectacles frame without eyeglass lenses in another alternative embodiment seen in perspective.

As an alternative embodiment of the spectacles frame 1 shown in the FIGS. 5 and 6, the FIGS. 8 and 9 show a spectacles frame 1 without eyeglass lenses 2 revealing that the spectacles frame 1 comprises two coupling elements 8 which can couple together the mount 3 and the spectacles frame 1.

In the embodiment shown in FIG. 8, the one coupling element 8 is in the shape of a tooth 11, while the other coupling element 8 is in the shape of a hook 12. The tooth 11 may preferably be formed as a pin 19 which is designed to interact with a hook 12' (see FIG. 10) in the mount.

In the embodiment shown in FIG. 9, both coupling elements 8 in the spectacles frame are formed as teeth 11.

Thus, there can be coupling elements 8 in many embodiments, where there are one, two, or more teeth, hooks, pins or other types of coupling elements 8 which are able to couple together a mount 3 and a spectacles frame 1.

As an alternative embodiment of the eyeglass lens 2 shown in FIGS. 1 to 4, FIGS. 10 and 11 show schematically an eyeglass lens 2 in an alternative embodiment for coupling to a spectacles frame 1.

Figure 10:
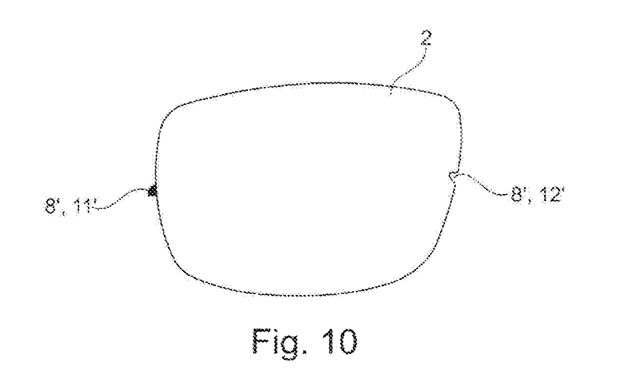
FIG. 10 shows a schematic cross section through an eyeglass lens in a mount seen from the front in an alternative embodiment for coupling to a spectacles frame.
Figure 11:
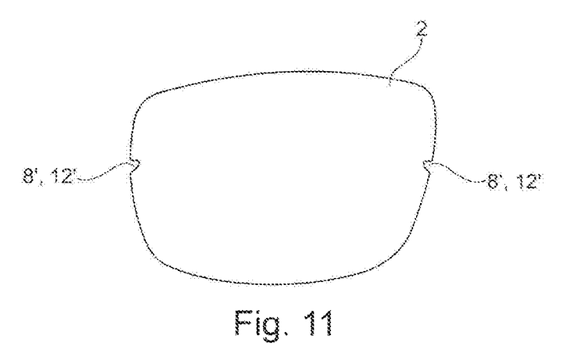
FIG. 11 shows a schematic cross section through an eyeglass lens in a mount seen from the front in another alternative embodiment for coupling to a spectacles frame.

FIGS. 10 and 11 show schematic cross sections through an eyeglass lens in a mount. For clarity, the transition between the mount and the eyeglass lens is not shown, since these figures serve to show the coupling elements more clearly.

In the embodiment shown in FIG. 10, the one coupling element 8' in the mount is in the form of a tooth 11', while the other coupling element 8' is in the form of a hook 12'. In the embodiment shown in FIG. 11, both coupling elements 8' are in the form of hooks 12'.

As mentioned above, there may thus be coupling elements 8' in many embodiments, where there are one, two, or more teeth, hooks, pins or other types of coupling elements 8' which are able to couple together a mount 3 and a spectacles frame 1.

Figure 12:
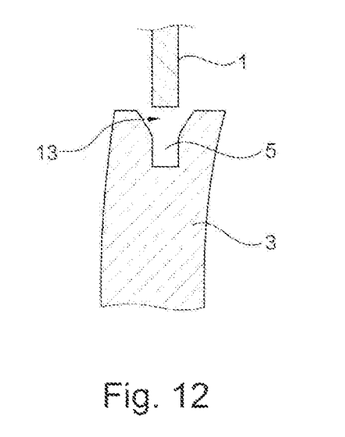
FIG. 12 shows a partial cross section through a mount and a spectacles frame for illustration of a recess in the mount.

FIG. 12 shows that the recess 5 has a funnel-shaped entry opening 13. This makes it easier to introduce the platelike frame in the recess 5.

Figure 13:
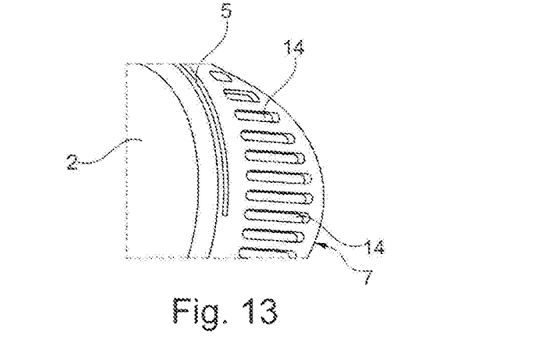
FIG. 13 shows a partial image of another embodiment of a partial section of the mount, seen from the outside of the spectacles.
Figure 15:
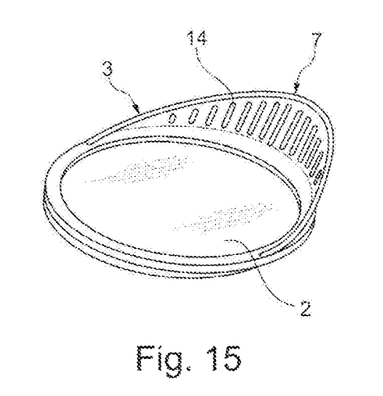
FIG. 15 shows an image of the second embodiment of a partial section of the mount, seen from the inside of the spectacles.

FIGS. 13 and 15 show another embodiment where the partial section 7 of the mount 3 comprises breakthroughs of material in the form of gaps 14.

Figure 14:
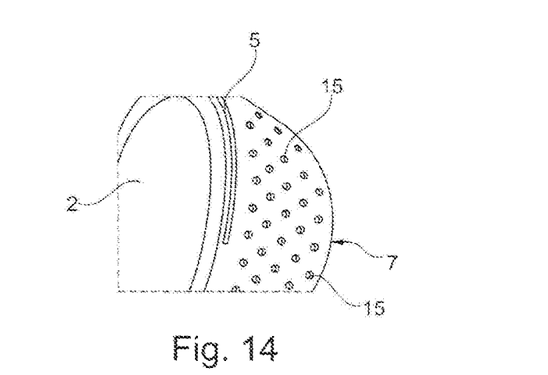
FIG. 14 shows a partial image of a third embodiment of a partial section of the mount, seen from the outside of the spectacles.
Figure 16:
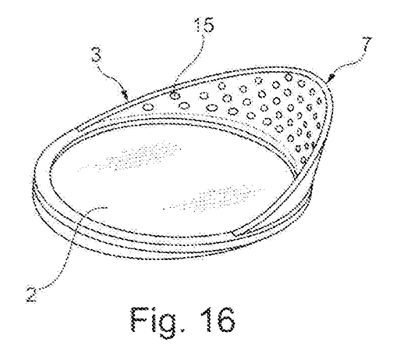
FIG. 16 shows an image of the third embodiment of a partial section of the mount, seen from the inside of the spectacles.

FIGS. 14 and 16 show a third embodiment where the partial section 7 of the mount 3 comprises breakthroughs of material in the form of holes 15

These breakthroughs 14, 15 of material will influence the air flow past the spectacles. They also contribute to the ornamental appearance of the spectacles.

Figure 17:
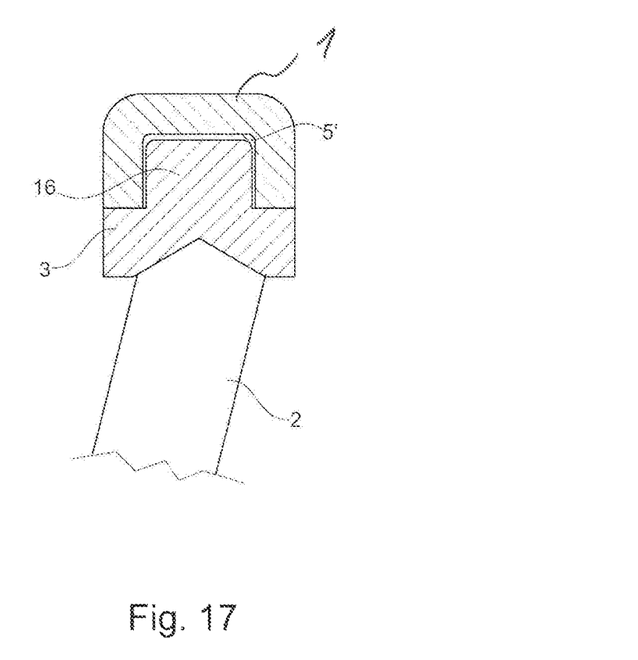
FIG. 17 shows a partial cross section through a mount and a spectacles frame for illustration of a recess in the spectacles frame.

FIG. 17 shows a partial cross section through a mount 3 and a spectacles frame 1 as illustration of a recess 5' in the spectacles frame. The recess 5' receives a bulge 16 which is formed on the outside of the mount 3, at least in the region for engagement with the spectacles frame 1.

Figure 18:
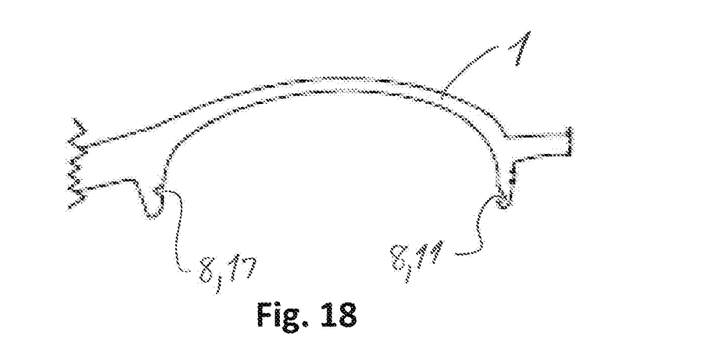
FIG. 18 shows a partial image of a spectacles frame seen from the front without eyeglass lenses in another alternative embodiment.

FIG. 18 shows a partial image of a spectacles frame 1 seen from the front without eyeglass lenses. It is seen here that the one coupling element 8 is in the form of a tooth 11, while the other coupling element 8 is in the form of a U-shaped notch 17. The notch 17 may preferably be formed to interact with a pin 19 which is mounted in aligned boreholes 18 (see FIG. 3) in each side wall of the recess 5 of the mount 3. The pin will preferably be a metal pin. A metal pin will be a stable and strong coupling element for engagement with the frame hook.

The invention claimed is:

1. Spectacles with interchangeable eyeglass lenses, where the spectacles comprise a spectacles frame and eyeglass lenses, where each eyeglass lens is fitted in a mount which is secured to an outer edge of the eyeglass lens, and where at least one of the mount and the spectacles frame comprises a coupling element, which can detachably couple together the mount and the spectacles frame, and in that the mount comprises an oblong recess designed to receive a partial frame section of the spectacles frame, characterized in that a pin, preferably a cylindrical pin, is mounted in aligned boreholes in each side wall of the mount's recess and that the coupling element is in the form of a U-shaped notch formed to interact with the pin.

2. The spectacles with interchangeable eyeglass lenses as claimed in claim 1, characterized in that the spectacles frame comprises a substantially m-shaped elastically deformable front bridge.

3. The spectacles with interchangeable eyeglass lenses as claimed in claim 2, characterized in that the front bridge is made of sheet metal, preferably by being folded from a flat blank.

4. The spectacles with interchangeable eyeglass lenses as claimed in claim 1, characterized in that the spectacles frame is made primarily of titanium.

5. The spectacles with interchangeable eyeglass lenses as claimed in claim 1, characterized in that the mount comprises at least one partial mount section for influencing the light penetration at the side of the eyeglass lens.

6. The spectacles with interchangeable eyeglass lenses as claimed in claim 1, characterized in that the mount comprises at least one partial mount section for influencing an air flow at the eyeglass lens.

7. The spectacles with interchangeable eyeglass lenses as claimed in claim 1, characterized in that the eyeglass lenses are made primarily of silica or polycarbonate.

8. The spectacles with interchangeable eyeglass lenses as claimed in claim 1, characterized in that the spectacles frame comprises at least one coupling element, which is designed for coupling to a mount for an eyeglass lens.

9. Mount fitted eyeglass lens where the mount is secured to an outer edge of the eyeglass lens and for spectacles with interchangeable eyeglass lenses as claimed in claim 1, characterized in that amount for the eyeglass lens comprises at least one coupling element, which is designed for coupling to a spectacles frame.

10. The spectacles with interchangeable eyeglass lenses as claimed in claim 1, characterized in that the recess has a funnel-shaped entry opening.

\* \* \* \* \*

UNITED STATES PATENT AND TRADEMARK OFFICE
CERTIFICATE OF CORRECTION

| | |
|---|---|
| PATENT NO. | : 11,143,883 B2 |
| APPLICATION NO. | : 16/333692 |
| DATED | : October 12, 2021 |
| INVENTOR(S) | : Lindberg et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 315 days.

Signed and Sealed this
Thirty-first Day of January, 2023

Katherine Kelly Vidal
*Director of the United States Patent and Trademark Office*